United States Patent [19]
Merritt

[11] Patent Number: 6,121,751
[45] Date of Patent: Sep. 19, 2000

[54] BATTERY CHARGER FOR CHARGING A STACK OF MULTIPLE LITHIUM ION BATTERY CELLS

[75] Inventor: Lauren V. Merritt, Sunnyvale, Calif.

[73] Assignee: Lockheed Martin Corporation, Bethesda, Md.

[21] Appl. No.: 09/266,510

[22] Filed: Mar. 11, 1999

[51] Int. Cl.[7] .................................................. H02J 7/00
[52] U.S. Cl. ............................................................ 320/116
[58] Field of Search .................................... 320/116, 118, 320/119

[56] References Cited

U.S. PATENT DOCUMENTS

| | | |
|---|---|---|
| 4,079,303 | 3/1978 | Cox . |
| 4,084,124 | 4/1978 | Kapustka . |
| 4,238,721 | 12/1980 | DeLuca . |
| 4,614,905 | 9/1986 | Petersson . |
| 4,710,504 | 12/1987 | Pascual et al. ........................... 320/118 |
| 4,725,784 | 2/1988 | Peled et al. . |
| 4,736,150 | 4/1988 | Wagner . |
| 4,770,954 | 9/1988 | Noordenbos . |
| 4,831,595 | 5/1989 | Bone . |
| 5,028,860 | 7/1991 | Amano . |
| 5,070,427 | 12/1991 | Bush . |
| 5,119,009 | 6/1992 | McCaleb et al. . |
| 5,168,206 | 12/1992 | Jones . |
| 5,302,902 | 4/1994 | Groehl . |
| 5,387,857 | 2/1995 | Honda et al. . |
| 5,412,305 | 5/1995 | Jeanneret . |
| 5,504,415 | 4/1996 | Podrazhansky . |
| 5,519,563 | 5/1996 | Higashijima et al. ................... 320/118 |
| 5,557,189 | 9/1996 | Suzuki et al. . |
| 5,578,914 | 11/1996 | Morita . |
| 5,652,501 | 7/1997 | McClure et al. ......................... 320/118 |
| 5,710,504 | 1/1998 | Pascual et al. . |
| 5,742,148 | 4/1998 | Sudo et al. .............................. 320/118 |
| 5,818,201 | 10/1998 | Stockstad et al. ...................... 320/116 |
| 5,825,155 | 10/1998 | Ito et al. ................................. 320/118 |
| 5,905,361 | 5/1999 | Saeki et al. ............................. 320/119 |
| 5,932,990 | 8/1999 | Kaneko ................................... 320/122 |

*Primary Examiner*—Peter S. Wong
*Assistant Examiner*—Pia Tibbits
*Attorney, Agent, or Firm*—Donald C. Feix

[57] ABSTRACT

A battery charging apparatus for charging a stack of multiple lithium ion battery cells charges the stack by a combination of switched capacitance cell balancing and cell voltage monitoring to provide a charge cycle that starts with a nominally constant current charging and easily shifts to constant voltage taper charging.

11 Claims, 3 Drawing Sheets

Constant Current / Constant Voltage Charger With Swithed Capacitor Balance Circuit in Both Charger and Battery

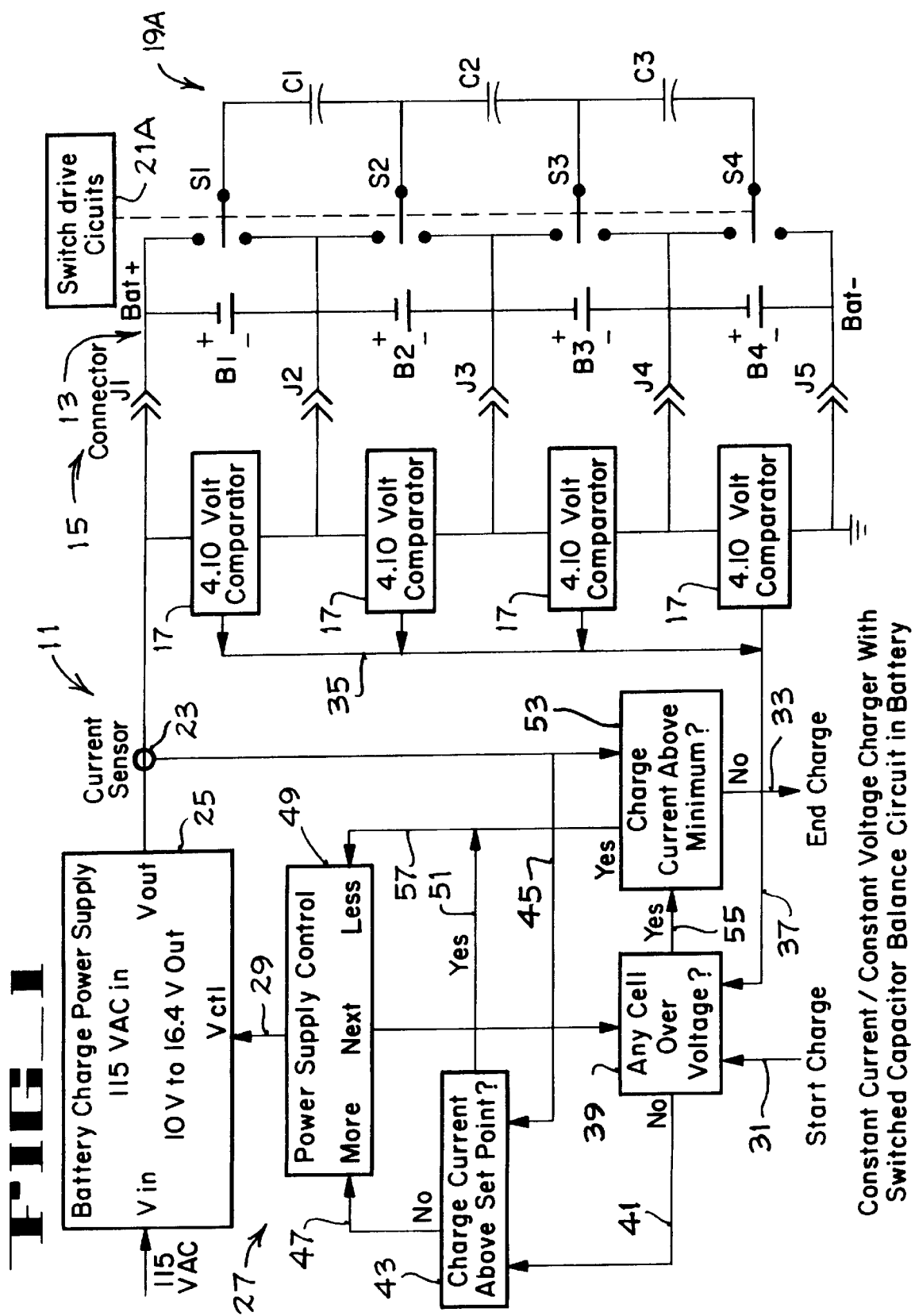

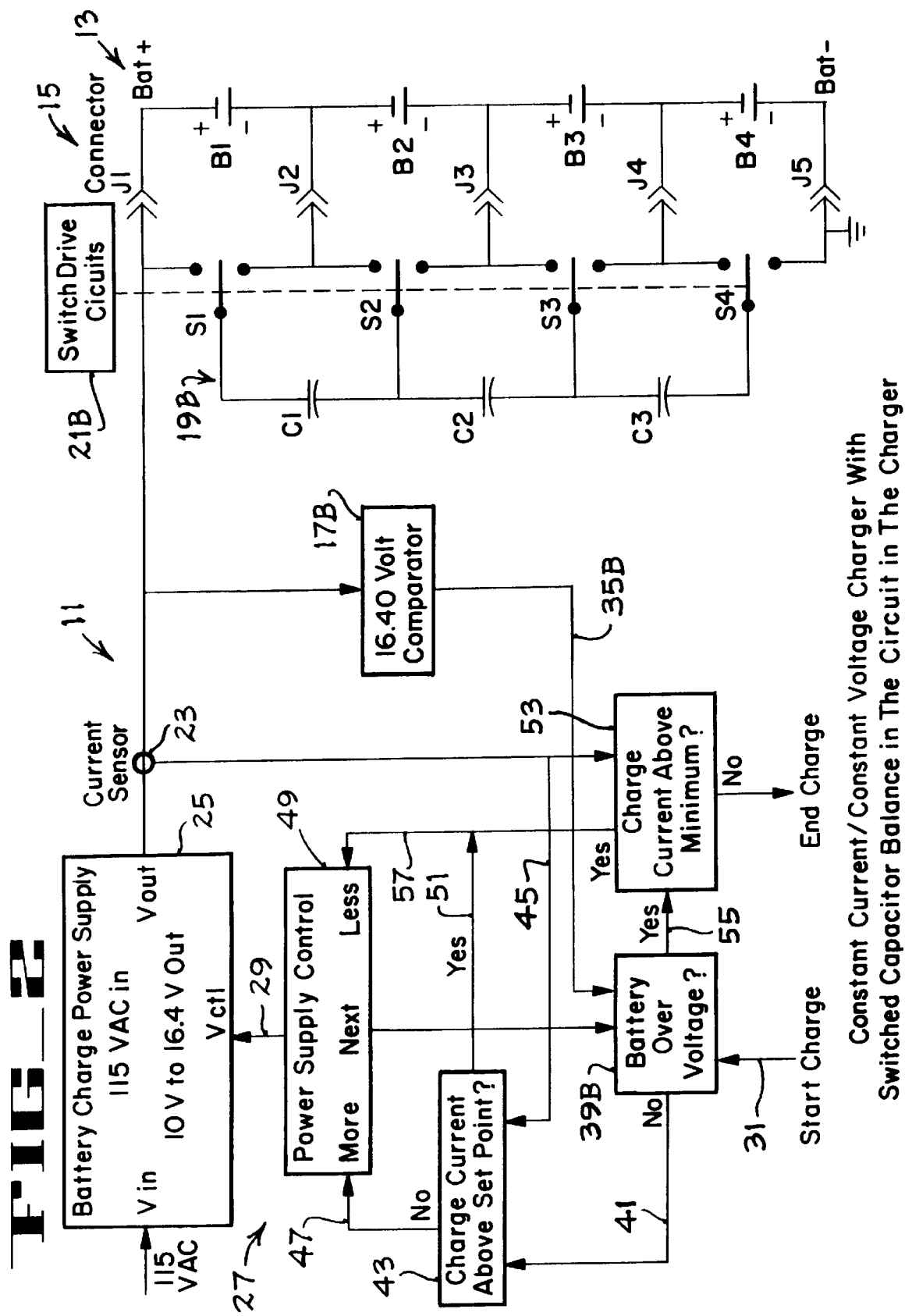
FIG_2   Constant Current/Constant Voltage Charger With Switched Capacitor Balance in The Circuit in The Charger

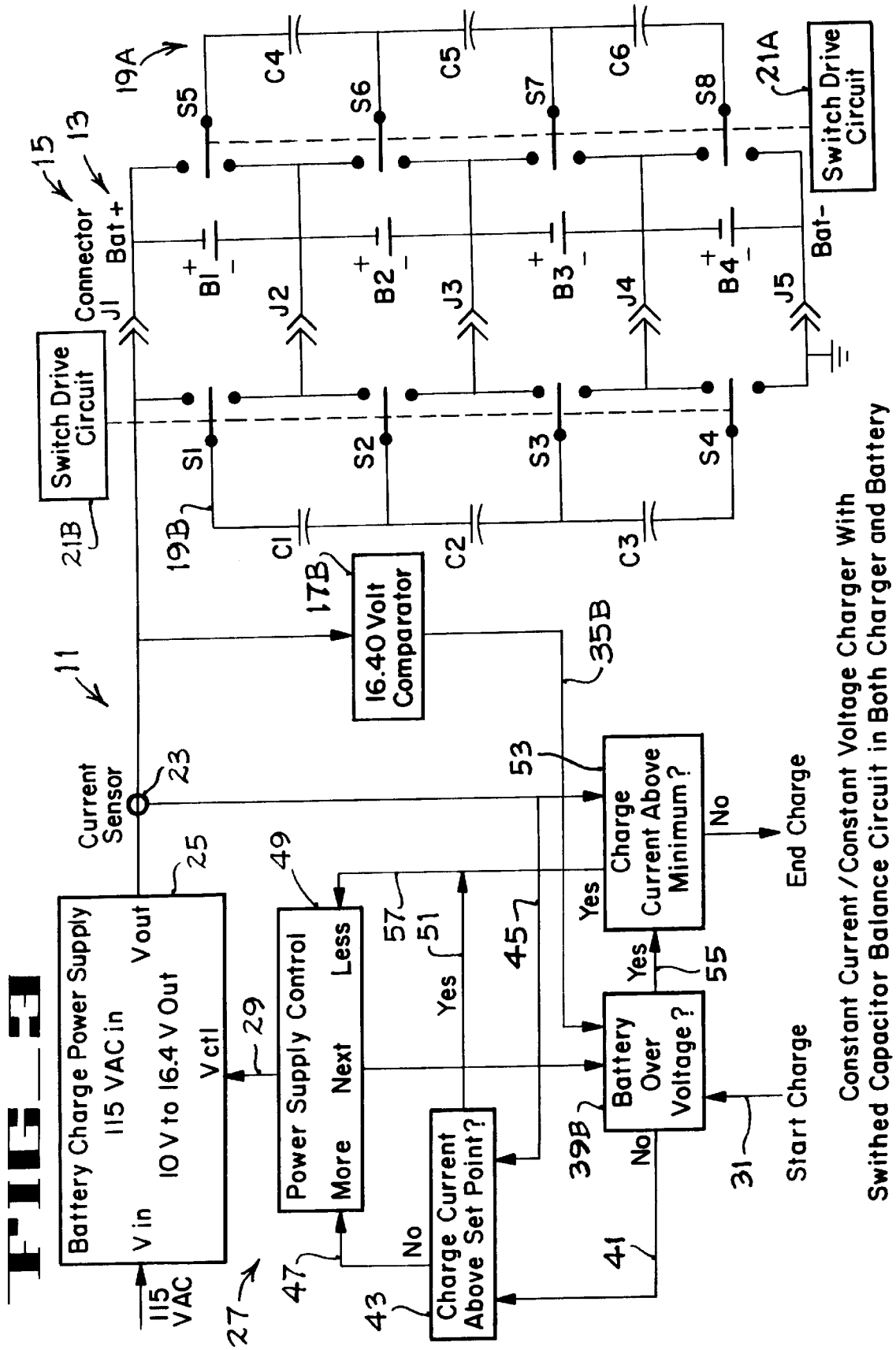

BATTERY CHARGER FOR CHARGING A STACK OF MULTIPLE LITHIUM ION BATTERY CELLS

BACKGROUND OF THE INVENTION

This invention relates to battery charging apparatus and methods for charging a stack of multiple lithium ion battery cells.

As noted in my prior U.S. Pat. No. 5,773,959, which is incorporated by reference in this application, lithium polymer battery cells are unforgiving of overcharge. Overcharging damages the battery cell seriously. It is essential to avoid overcharging of a lithium polymer battery cell. The lithium polymer chemistry is such that it tends to self destruct above 4.2 volts, so it is desired to get all cells up as close to 4.1 volts as possible. This winds up to be a matching problem. By the time all four cells of a four cell stack, or all twenty cells in a twenty cell stack, get to 4.1 volts, the final balancing is desired to be done for 40 to 50 millivolts. This involves matching to about 1%. Matching to this degree can be difficult. A switched capacitor balancer can be associated with the stack to assist in matching the voltages. The charge can be moved from higher voltage cells to lower voltage cells in the stack by the action of the switched capacitor balancer, and the switched capacitor balancer can provide a relatively lossless balancing.

It is an important object of the present invention to charge a stack of multiple lithium ion battery cells by a combination of switch capacitance cell balancing and cell voltage monitoring to provide a charge cycle that starts with a nominally constant current charging and easily shifts to multi-cell constant voltage taper charging.

SUMMARY OF THE INVENTION

A battery charging apparatus and method for charging a stack of multiple lithium ion battery cells charges the stack of cells by a combination of switch capacitance cell balancing and cell voltage monitoring to provide a charge cycle that starts with a nominally constant current charging and easily shifts to constant voltage taper charging.

The battery charger apparatus comprises multiple lithium ion battery cells arranged in a stack.

A variable voltage power supply is connected to supply a direct current charging current to the stack.

A current sensor senses the amount of the charging current supplied to the stack.

A voltage comparator senses the voltage of the cells in the stack.

A power supply control is connected to the variable voltage power supply for supplying a control signal to the power supply.

Charge current monitoring means are connected to the current sensor and to the power supply control for controlling the charge current to charge the cells in a nominally constant current charge operation until at least one cell in the stack reaches full voltage.

A switched capacitor balancer circuit is associated with the stack so that charge can be moved from higher voltage cells to lower voltage cells in the stack.

The voltage comparator provides a certain sensed voltage to the power supply control means which is effective to shift the charge control from current control to constant voltage control.

The charge control can be moved from the current control to the constant voltage control, and the charging can be continued until the voltage comparator circuit and the current sensor indicate full charge of all of the cells in the stack.

Battery charging apparatus and methods which incorporate the features noted above and which are effective to function as described above comprise further objects of the present invention.

Other and further objects of the present invention will be apparent from the following description and claims and are illustrated in the accompanying drawings, which by way of illustration, show preferred embodiments of the present invention and the principles thereof and what are now considered to be the best modes contemplated for applying these principles. Other embodiments of the invention embodying the same or equivalent principles may be used and structural changes may be made as desired by those skilled in the art without departing from the present invention and the purview of the appended claims.

BRIEF DESCRIPTION OF THE DRAWING VIEWS

FIG. 1 is a block diagram view showing a battery charging apparatus for charging a stack of multiple lithium ion battery cells in accordance with one embodiment of the present invention. In the embodiment shown in FIG. 1 the battery charging apparatus charges a stack of lithium ion battery cells by a combination of switch capacitance cell balancing and cell voltage monitoring to provide a charge cycle that starts with a nominally constant current charging and easily shifts to constant voltage taper charging. In the embodiment shown in FIG. 1 the voltages of the several cells in the stack are monitored by individual comparators. In the embodiment shown in FIG. 1 the switched capacitor balancer circuit is located in the stack of lithium ion battery cells, the voltage comparator means are within the battery charging apparatus, and a current sensor is in the battery charging apparatus. These coact so that the charge control can be moved from constant current control to constant voltage control, back and forth if necessary, to permit the charging to be continued until the voltage comparator circuit and the current sensor indicate full charge of all of the cells in the stack.

FIG. 2 is a block diagram showing a battery charging apparatus constructed in accordance with a second embodiment of the invention. In FIG. 2 a switched capacitor balancer circuit is included within the battery charging apparatus. With the capacitor balancer circuit in the charger apparatus, the size of the capacitors can be significantly larger than the size of the capacitors that can be included in the switched capacitor balance circuit when the entire switched capacitor balancer circuit is located only in the stack of lithium ion battery cells. The larger capacitors can be sized to permit a rapid charge in the nominally constant current charge operations; and, with a large capacitor balancer in operation within the charger apparatus, the individual cell monitoring is not necessary.

FIG. 3 is a block diagram view showing a battery charging apparatus constructed in accordance with a third embodiment of the present invention. In the embodiment shown in FIG. 3 a switched capacitor balance circuit is included in both the charger apparatus and the battery stack. The switched capacitor balance circuit in the charger is optimized for charger operations while the battery located switched capacitor balance circuit is optimized for a discharge rate of the stack of batteries that is lower than the charge rate of the stack of batteries and is a discharge rate which can be intermittent.

DESCRIPTION OF THE PREFERRED EMBODIMENTS

A battery charging apparatus constructed in accordance with one embodiment of the present invention is indicated generally by the reference numeral 11 in FIG. 1.

The battery charging apparatus 11 is constructed and functions to charge a stack of multiple lithium ion battery cells which are indicated generally by the reference numeral 13 in FIG. 1.

The connector between the charger apparatus 11 and the stack 13 is indicated generally by the reference numeral 15 in FIG. 1.

In the embodiment shown FIG. 1 the battery charging apparatus 11 charges a stack 13 of lithium ion battery cells by a combination switch capacitance cell balancing and cell voltage monitoring to provide a charge cycle that starts with a nominally constant current charging and easily shifts to constant voltage taper charging.

In the embodiment shown in FIG. 1, the voltages of the several cells B1, B2, B3 and B4 in the stack 13 are monitored by individual comparators 17. The individual comparators 17 provide voltage comparator means, and the voltage comparator means are contained within the battery charging apparatus.

In the embodiment shown in FIG. 1 a switched capacitor balancer circuit 19A is located in the stack 13 of lithium ion battery cells B1–B4.

The switched capacitor balancer circuit 19A includes capacitors C1, C2 and C3 which are associated with the cells B1, B2, B3 and B4 by switches S1, S2, S3 and S4 and switch drive circuits 21A.

The operation of a switched capacitor balancer circuit is, by itself, known in the art, but the overall operation of the balancer will be reviewed briefly at this point.

With switch S1 and S2 flipped up, the capacitor C1 is across the battery B1. The capacitor C1 charges to the voltage across the battery B1.

When switch S1 and S2 are flipped down, the capacitor C1 is across the cell B2. If the cell B2 is of higher voltage than the cell B1, the capacitor C1 gets charged further.

If the cell B1 has a higher voltage, the capacitor C1 dumps its higher voltage charge into the cell B2.

If the pair of switches S1 and S2 flip back and forth enough times, the cells B1 and B2 will be driven to substantially the same voltage.

Thus, if you have the cells B1, B2, B3 and B4 and if you have the switches S1, S2, S3 and S4 flipping, the resistances of the switches do not matter, the values of the capacitors C1, C2 and C3 do not matter, and the cells B1, B2, B3 and B4 will all drive to the same voltage.

With three capacitors C1, C2 and C3 you can balance the four battery cells B1, B2, B3 and B4.

This is an almost lossless balancing act by the switched capacitor balancer circuit.

With a semiconductor switch the switching of the capacitors can be run at 20,000 cycles per second or at lower kilohertz rates.

Thus, in the embodiment shown in FIG. 1, the four cell stack 13 has its several voltages matched by a switched capacitor balancer circuit 19A located in the stack 13, and the voltages of the several cells B1–B4 are monitored by individual comparators 17.

In the embodiment shown in FIG. 1, the charge current is provided by a variable voltage power supply provided by the battery charging apparatus 11. The battery charging apparatus 11 is shown connected, for illustration, to 115 VAC mains.

The amount of charge current provided by the battery charging apparatus 11 is monitored by a current sensor 23.

As illustrated in FIG. 1, the battery charging apparatus 11 comprises a battery charge power supply which receives a 115 VAC voltage Vin and which produces a 10 volt to 16.4 volt (Vout) output through the current sensor 23.

The power supply control means 27 are connected to the variable voltage power supply 25 for supplying a control signal (Vctl) through a line 29 to the battery charge power supply 25.

The battery charging apparatus 11 includes an input line 31 for transmitting an input signal to start the charge and includes a line 33 for transmitting an end of charge output indication, at the time that the charge operation has been completed.

The voltage output from the supply 25 flows through the current sensor 23 and to the connector 15 to the stack 13 of the multiple lithium ion battery cells B1–B4.

The outputs of the individual comparators 17 are transmitted on a line 35 and on a line 37 to a measuring unit 39 which determines whether any of the cells is over voltage. One output of this measuring unit 39, the "no cell is over voltage" output, is transmitted on a line 41 to a charge current set point unit 43. The unit 43 is also connected to the current sensor 23 by a line 45.

One output of a charge current set point measuring unit 43 (the output indicating that the charge current is not above the set point) is connected by a line 47 to a power supply control unit 49.

The charge current set point measuring unit 43 has a second output (the output indicating that the charge current is above the set point) which is connected by a line 51 to the power supply control unit 49.

The output line 45 of the current sensor 23 is also connected as an input to a charge current above minimum measuring unit 53.

A line 55 (indicating that any one of the cells is over voltage) extends from the any cell over voltage measuring unit 39 and is an input to the charge current above minimum measuring unit 53.

An output line 57 of the charge current above minimum measuring unit 53 is connected to the power supply control unit 49 so that, if the charge current is above a minimum value, the power supply control unit 49 reduces the control signal on the output line 29 when the output signal on the line 55 indicates that any cell is over voltage.

In the operation of the battery charging apparatus 11 illustrated in the FIG. 1 embodiment, the several cell voltages are assumed to be in disarray at the start of charge.

In fact, the cell voltages may not even be balanced due to several voltages being so low that the balancing circuit 19A does not work.

The first action in the operation is to check whether a cell voltage is excessive.

Then the amount of charge current is checked. The power supply output is then increased by some increment, and the above check routine is repeated.

This routine, as described above, will increase the power supply voltage until either the nominal charge current is reached or a cell reaches full voltage.

Assuming that no comparator 17 objects, a voltage that gives a nominal charge current will be reached.

As the cells B1–B4 are subsequently charged at constant voltage the charge current will fall. This will be detected by the current feedback loop and the power supply voltage will be increased.

Thus, the several cell voltages will rise under a nominally constant current charge operation.

During this period of operation the cell balancer circuit 19A may or may or not work from time to time. When it does work, its operation will move charge from the higher voltage cells to the lower voltage cells.

In due course one voltage comparator 17 will indicate that its cell has reached full charge. The power supply voltage will be reduced through the action of the any cell over voltage measuring unit 39 to remove this indication.

Assuming nothing else happens, charge control will now be dominated by the particular voltage comparator 17 and the charge current will fall. Constant voltage charging will be done.

By the time one cell voltage is at its limit, the other cells will be close enough so that the cell balancer circuits 19A will be operating. The cell balancer circuits 19A will transfer charge away from the highest voltage cell toward lower voltage cells. Thus, the charge current will not fall as fast as it might be expected from unassisted constant voltage charging.

Indeed, the control may move back and forth between the current loop and the voltage comparator loop multiple times.

In due course, the charge current falls below a minimum level. Then charging is stopped and is indicated on the end of charge line 33.

In the FIG. 1 embodiment the switched capacitor balancer circuit is in the battery. The cell balancing effect of moving charge from the higher voltage cells to the lower voltage cells is useful in the battery. It allows all cells to reach the discharge minimum voltage at approximately the same time. The battery capacity therefore is not dominated by the cell with the lowest capacity when there is a switched capacitor circuit in the battery.

There is, however, an economic benefit in having the switched capacitor balancer circuit in the charger. A switched capacitor balancer circuit in the charger can be made larger because there is room. It adds to the cost of the charger while reducing the cost of the battery, so the system cost is reduced from this consideration alone.

With a large capacitor balancer in operation, the individual cell monitoring is not necessary. Since only one comparator is needed, the cost of the charger does not go up as much as might be expected.

The switched capacitor balancer is more effective as the switched capacitor balancer gets bigger and bigger. You can transfer more charge rapidly. The capacitive balancer in the battery can be optimized for the maximum discharge capability of the battery, and the capacitive balancer in the charger can be optimized for rapid charging of the battery.

By putting the capacitor balancer in the charger, the size of the capacitors can be made quite a bit larger than the size of the capacitors in a cell balancer located within the battery pack.

Using larger capacitors permits charging of the battery in less time because the larger capacitors will permit using a higher charging current than can be used with small capacitors.

As noted above, putting the capacitive balance inside the charger also eliminates the need for individual cell monitoring. With a larger capacitor balancer in operation in the charger only one comparator is needed, as will be apparent from the following description of the FIG. 2 embodiment.

FIG. 2 shows a second embodiment of the invention in which a switched capacitor balance circuit 19B is included within the battery charging apparatus 11.

It should be noted that the components in FIG. 2 which correspond to the components shown in FIG. 1 are indicated by the same reference numerals.

However, in FIG. 2 the switched capacitor balancer circuit is indicated by the reference numeral 19B, the voltage comparator unit is indicated by the reference numeral 17B and the battery over voltage measuring and detecting unit is indicated by the reference numeral 39B.

The voltage comparator 17B is a single comparator unit which measures the voltage across the entire stack 13 and which limits that voltage to 16.40 volts for the four battery stack shown in FIG. 2. The voltage comparator 17B does not send a battery over voltage signal on the line 35B until the voltage across the stack 13 reaches 16.40 volts.

In that event the battery over voltage unit 39B sends a signal to the charge current unit 43 to cause a signal to be transmitted on the line 51 to the power supply control 49, and the power supply control unit then reduces the voltage control signal on the line 29 to shift the charge control from current control to constant voltage control.

The charging can then be continued until the voltage comparator 17B and the current sensor 23 indicate full charge of all of the cells in the stack.

In accordance with the present invention the capacitive balancer circuit 19B can be maintained in a non-operating mode until the battery charging apparatus 11 shifts control to the constant voltage control. There are good electrochemical reasons to have the capacitive balancer working only during the constant voltage charge mode.

In the embodiment of the invention shown in FIG. 2 the switched capacitor balancer is located only in the battery charging apparatus 11, and there is no switched capacitor balancer in the stack 13 of the battery cells.

FIG. 3 shows an embodiment of the invention in which a switched capacitor balancer 19B is located within the battery charging apparatus and a switched capacitor balancer 19A is located within the stack 13.

FIG. 3 thus shows an embodiment in which capacitor balancers are operative in both the charger and the battery pack.

In the FIG. 3 embodiment the charge balancer is optimized for charger operations, while the battery located balancer is optimized for a lower, and probably intermittent discharge rate.

The components in FIG. 3 which correspond to the components in FIG. 1 and FIG. 2 are indicated by like reference numerals.

While I have illustrated and described the preferred embodiments of my invention, it is to be understood that these are capable of variation and modification, and I therefore do not wish to be limited to the precise details set forth, but desire to avail myself of such changes and alterations as fall within the purview of the following claims.

What is claimed is:

1. A battery charging apparatus for charging a stack of multiple lithium ion battery cells by a combination of switch capacitance cell balancing and multiple cell voltage monitoring to provide a charge cycle that starts with a nominally constant current charging and easily shifts to multi-cell constant voltage taper charging, said apparatus comprising, multiple lithium ion battery cells arranged in a stack, a variable voltage power supply connected to supply a direct current charging current to the stack, a current sensor for sensing the amount of the charging current supplied to the stack, voltage comparator means for sensing the voltage of each cell in the stack, power supply control means connected to the variable voltage power supply for supplying a control signal to the power supply, charge current monitoring means connected to the current sensor and to the power supply control means for controlling the charge current to charge the cells in a nominally constant current charge operation until at least one cell in the stack reaches full voltage, a switched capacitor balancer circuit associated with the stack so that charge can be moved from higher voltage cells to lower voltage cells in the stack, said voltage comparator means providing a sensed full voltage signal to the power supply control means when any cell reaches full voltage, said sensed full voltage signal being effective to cause the power supply control means to shift the charge control from current control to constant voltage control so that after at least one cell has reached its full indicated charge, the charge control is moved back and forth between the current control and the constant voltage control until the voltage comparator circuit and the current sensor indicate full charge of all of the cells in the stack.

2. A battery charging apparatus for charging a stack of multiple lithium ion battery cells by a combination of switch capacitance cell balancing and cell voltage monitoring to provide a charge cycle that starts with a nominally constant current charging and easily shifts to constant voltage taper charging, said apparatus comprising, multiple lithium ion battery cells arranged in a stack, a variable voltage power supply connected to supply a direct current charging current to the stack, a current sensor for sensing the amount of the charging current supplied to the stack, voltage comparator means for sensing the voltage of the cells in the stack, power supply control means connected to the variable voltage power supply for supplying a control signal to the power supply, charge current monitoring means connected to the current sensor and to the power supply control means for controlling the charge current to charge the cells in a nominally constant current charge operation until at least one cell in the stack reaches full voltage, a switched capacitor balancer circuit associated with the stack so that charge can be moved from higher voltage cells to lower voltage cells in the stack, said voltage comparator means providing a certain sensed voltage to the power supply control means, said certain sensed voltage being effective to cause the power supply control means to shift the charge control from current control to constant voltage control so that, after at least one cell in the stack has reached full voltage, the charge control can be moved from the current control to the constant voltage control and the charging can be continued until the voltage comparator circuit and the current sensor indicate full charge of all of the cells in the stack.

3. The invention defined in claim 2 wherein the charge current monitoring means monitor whether the charge current sensed by the current sensor is above a minimum charge current and wherein the charging operation is ended when the charge current drops below the minimum charge current.

4. The invention defined in claim 2 wherein the voltage comparator means sense the total voltage of the cells in the stack.

5. The invention defined in claim 2 wherein the control signal to the power supply is a voltage control signal.

6. The invention defined in claim 2 wherein the switched capacitor balancer circuit comprises a switched capacitor balance circuit in the stack.

7. The invention defined in claim 2 wherein the switched capacitor balancer circuit comprises a switched capacitor balance circuit in the charger and includes capacitors which are sized to permit a rapid charge rate in said nominally constant current charge operation.

8. The invention defined in claim 7 wherein the switched capacitor balancer circuit is turned off during the nominally constant current charge operation and wherein the switched capacitor balancer circuit is turned on for charge control during the constant voltage control.

9. The invention defined in claim 7 wherein the switched capacitor balancer circuit includes in addition a switched capacitor balancer circuit in the stack and includes capacitors which are sized to be optimized for a low and intermittent discharge rate of the stack.

10. The invention defined in claim 2 wherein the voltage comparator means include an individual voltage comparator for sensing the voltage of each cell in the stack and wherein the voltage comparator means are effective to shift the charge control from current control to constant voltage control when any cell reaches full voltage.

11. A method of charging a stack of multiple lithium ion battery cells by a combination of switch capacitance cell balancing and multiple cell voltage monitoring to provide a charge cycle that starts with a nominally constant current charging and easily shifts to multi-cell constant voltage taper charging, said method comprising, arranging multiple lithium ion cells in a stack, connecting a variable voltage power supply to the stack, checking whether any cell voltage in the stack is excessive, checking whether the charge current to the stack is above a set point, increasing the power supply output by an increment and repeating said checking of the cell voltage and said checking of the charge current until either the set point charge current is reached or a cell voltage reaches full voltage, continuously monitoring the charge current and controlling the charge current to charge the cells in a nominally constant current charge operation until at least one cell in the stack reaches full voltage, associating a switched capacitor balancer circuit with the stack so that charge can be moved from higher voltage cells to lower voltage cells in the stack, associating a voltage comparator circuit with the stack and the variable voltage power supply so that charge control can be moved from current control to constant voltage control, and after at least one cell in the stack has reached its full indicated charge, moving the charge control back and forth between the current control and the constant voltage control as may be needed so that the charging can be continued until the voltage comparator circuit and the continuous monitoring of the charge control circuit indicate full charge of all of the cells in the stack.

* * * * *